US008953080B2

(12) United States Patent
Hirata

(10) Patent No.: US 8,953,080 B2
(45) Date of Patent: Feb. 10, 2015

(54) IMAGE DISPLAY APPARATUS AND IMAGE DISPLAY METHOD FOR SWITCHING A DISPLAY MODE

(75) Inventor: Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 12/905,481

(22) Filed: Oct. 15, 2010

(65) Prior Publication Data

US 2011/0090353 A1 Apr. 21, 2011

(30) Foreign Application Priority Data

Oct. 19, 2009 (JP) ................................. 2009-240752

(51) Int. Cl.
H04N 5/232 (2006.01)
H04N 5/228 (2006.01)

(52) U.S. Cl.
CPC ....... H04N 5/23293 (2013.01); H04N 5/23219 (2013.01); H04N 5/23245 (2013.01)
USPC .............. 348/333.02; 348/222.1; 348/333.05; 348/333.12; 396/274

(58) Field of Classification Search
USPC ............... 348/220.1, 333.05, 333.11, 333.12, 348/333.02
See application file for complete search history.

(56) References Cited

U.S. PATENT DOCUMENTS

| 7,176,964 | B1* | 2/2007 | Sogabe et al. | 348/220.1 |
|---|---|---|---|---|
| 7,196,727 | B2* | 3/2007 | Sato | 348/333.11 |
| 7,480,002 | B2* | 1/2009 | Goh et al. | 348/333.05 |
| 8,390,719 | B2* | 3/2013 | Itoh | 348/333.05 |
| 2003/0156212 | A1* | 8/2003 | Kingetsu et al. | 348/333.12 |
| 2004/0102226 | A1* | 5/2004 | Miwa | 455/566 |
| 2006/0152600 | A1* | 7/2006 | Hamada et al. | 348/231.99 |
| 2006/0221223 | A1* | 10/2006 | Terada | 348/333.05 |
| 2008/0088710 | A1* | 4/2008 | Iwamoto et al. | 348/220.1 |
| 2008/0152226 | A1 | 6/2008 | Ryuto | |
| 2010/0013977 | A1* | 1/2010 | Suzuki | 348/333.11 |
| 2010/0026843 | A1* | 2/2010 | Tezuka et al. | 348/231.2 |

FOREIGN PATENT DOCUMENTS

| JP | 11-041549 A | 2/1999 |
|---|---|---|
| JP | 2005-352944 A | 12/2005 |
| JP | 2006-180403 A | 7/2006 |
| JP | 2006-295242 A | 10/2006 |
| JP | 2006-303707 A | 11/2006 |
| JP | 2009-095002 A | 4/2009 |
| JP | 2009-105942 A | 5/2009 |
| JP | 2009-253513 A | 10/2009 |

OTHER PUBLICATIONS

Office Action issued on Nov. 12, 2013 in counterpart Japanese Patent Application No. 2009-240752.
Office Action issued on Aug. 13, 2013 in counterpart Japanese Patent Application No. 2009-240752.
Japanese Office Action issued on Nov. 25, 2014 in corresponding application No. 2014036895.

* cited by examiner

Primary Examiner — Ngoc-Yen Vu
(74) Attorney, Agent, or Firm — Carter, DeLuca, Farrell & Schmidt, LLP

(57) ABSTRACT

A display apparatus of the present invention includes a reception unit configured to receive an image captured by an imaging apparatus from the imaging apparatus and a switching unit configured to switch the display mode of the captured image to a single shooting display mode for displaying the image captured by the imaging apparatus in the single shooting mode or a continuous shooting display mode for displaying the image captured by the imaging apparatus in the continuous shooting mode based on an interval at which the captured image is received by the reception unit.

21 Claims, 10 Drawing Sheets

SETTING TABLE

| SHOOTING SCENE | ISO SENSITIVITY | Av VALUE | Tv VALUE | ... |
|---|---|---|---|---|
| WEDDING CEREMONY | 400 | 1.0 | 1/40 | ... |
| WEDDING CEREMONY (GROUP PHOTO) | 800 | 1.2 | 1/45 | ... |
| ... | ... | ... | ... | ... |

IMAGE DISPLAY APPARATUS AND IMAGE DISPLAY METHOD FOR SWITCHING A DISPLAY MODE

BACKGROUND OF THE INVENTION

1. Field of the Invention

The present invention relates to an image display apparatus, an image display method, and a program.

2. Description of the Related Art

In recent years, a shooting system capable of displaying an image captured with a digital camera by a photographer on a monitor of a personal computer to confirm the captured image in situ has been introduced in a photo studio where a commemorative photo is taken. Such a shooting system is capable of displaying a captured image obtained by shooting and an image obtained by extracting a human face from the captured image on the same screen. The captured image is displayed to assist a photographer to determine whether shooting is successful.

U.S. Patent Publication No. 2008/0152226 (Japanese Patent Application Laid-Open No. 2006-180403) discusses an image processing apparatus for extracting a face from a captured image and displaying the face. Most of capture assistance systems described above have a single display mode to confirm a captured image. In the single display mode, there is no problem as long as a photographer takes a picture one by one, and confirms captured photos one by one. However, in a case where photos are continuously shot, in other words, a plurality of photos is taken at a time, only the image taken last is largely displayed and the rest of the images cannot be viewed unless thumbnail images are in a retrospective manner displayed. In the continuous shooting, a photographer mostly wants to grasp the overview of captured images obtained by the continuous shooting rather than confirm one image in detail. If only a single shooting mode is provided, a photographer cannot obtain confirmation as he intends.

Even if a plurality of display modes are provided, the modes are switched by a photographer as a user specifying a display mode, so that a screen operation needs to be carried out to switch between the single and continuous shooting modes. For this reason, the photographer needs to manually switch the display mode each time if the single and the continuous shooting are randomly performed, which reduces the productivity of the photographer.

SUMMARY OF THE INVENTION

The present invention is directed to provide a technique capable of improving the productivity of a photographer i.e., a user.

The present invention includes a reception unit configured to receive an image captured by an imaging apparatus from the imaging apparatus and a switching unit configured to switch the display mode of the captured image to a single shooting display mode for displaying the image captured by the imaging apparatus in the single shooting mode or a continuous shooting display mode for displaying the image captured by the imaging apparatus in the continuous shooting mode based on an interval at which the captured image is received by the reception unit.

Such a configuration switches between a single shooting display mode and a continuous shooting mode based on an interval at which the captured image is received from an imaging apparatus to provide a technique for improving the productivity of a photographer i.e., a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
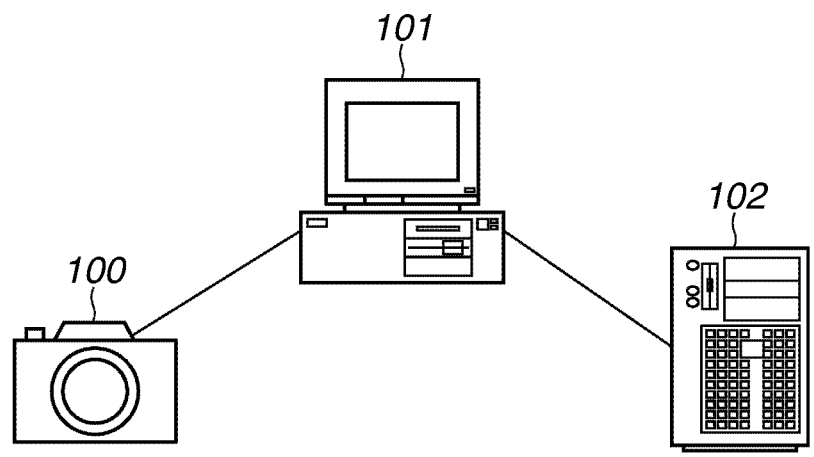
FIG. 1 illustrates an example of a configuration of a shooting system.

FIG. 1 illustrates an example of a configuration of a shooting system. The shooting system of the present exemplary embodiment is configured such that a camera 100 being an example of an imaging apparatus, a captured image confirmation apparatus 101, and a captured image control apparatus 102 are connected to each other via a network. An image captured with the camera 100 is transferred to the captured image confirmation apparatus 101 via the network. A photographer confirms the captured image using the captured image confirmation apparatus 101. The confirmed image is transferred from the captured image confirmation apparatus 101 to the captured image control apparatus 102 and controlled in an integrated fashion. In FIG. 1, although a single camera 100 and a single captured image confirmation apparatus 101 are used therein, the captured image confirmation apparatus 101 can communicate with a plurality of the cameras 100. The captured image control apparatus 102 can communicate with a plurality of the captured image confirmation apparatus 101.

Figure 2:
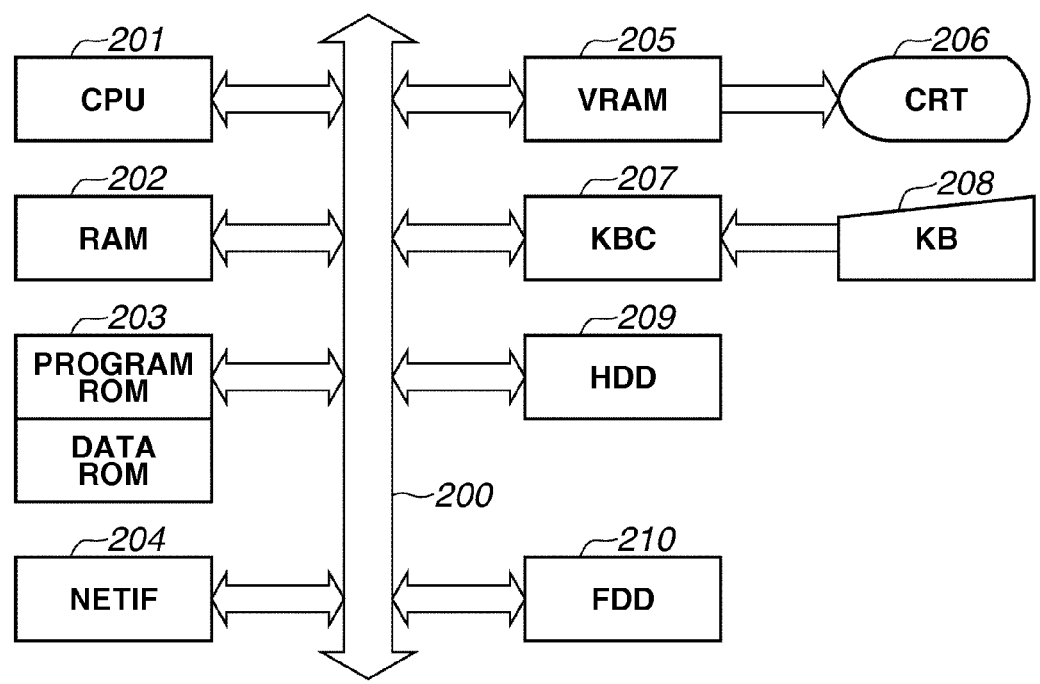
FIG. 2 illustrates an example of a hardware configuration of the captured image confirmation apparatus.

A hardware configuration is described below using FIG. 2 in which the captured image confirmation apparatus 101 includes a computer (a computer system) such as a personal computer (PC). FIG. 2 illustrates an example of a hardware configuration of the captured image confirmation apparatus 101.

The captured image confirmation apparatus 101 can be realized by an apparatus described below or a combination of a plurality of apparatus as well as a personal computer (PC).

More specifically, the captured image confirmation apparatus 101 can be realized by various household electric appliances such as a work station, a notebook PC, palm top PC, and a computer-incorporated television, terminals such as a game machine, a telephone set, a facsimile machine, a cellular phone, a PHS, and an electronic organizer or a combination of the above apparatus.

A central processing unit (hereinafter referred to as a CPU) 201 controls a computer system. A random access memory (hereinafter referred to as a RAM) 202 functions as a main memory of the CPU 201, an area and an execution area of an execution program and a data area.

A read only memory (hereinafter referred to as a ROM) 203 includes a program ROM for recording a basic software (OS) which is a system program for controlling the apparatus of the computer system and a data ROM for recording information required for operating the system. An HDD 209 can be used instead of the ROM 203 or along with the ROM 203.

A network interface (hereinafter referred to as a NETIF) 204 performs control for transferring data between computer systems (between the apparatus) via the network and carries out the diagnosis of connection status therebetween.

A video RAM (hereinafter referred to as a VRAM) 205 develops the image indicating operation status of the computer system which is displayed on the screen of a CRT 206 as described later, and controls the display.

A display apparatus 206 is hereinafter referred to as a CRT.

A KBC 207 is a controller for controlling a signal input from an external input device 208 described later.

The external input device (hereinafter referred to as a KB) 208 receives operation which the user of the computer system performs on the computer system, and is a keyboard, for example.

A hard disk (hereinafter referred to as a HDD) 209 functions as a storage apparatus. The HDD 209 is used for storing an application program and data such as a captured image, a setting value table, and a setting file.

An external input/output apparatus (hereinafter referred to as a FDD) 210 is used for reading an application program from a storage medium.

The application program or data stored in the HDD 209 may be stored in the FDD 210 and used.

An input/output bus (an address bus, data bus, and control bus) 200 connects between the above units.

The CPU 201 reads the program stored in the HDD 209 or the storage medium, saves on the RAM 202, and executes the program, thereby realizing the function of the captured image confirmation apparatus 101 and the processing related to a flow chart described later.

Figure 3:
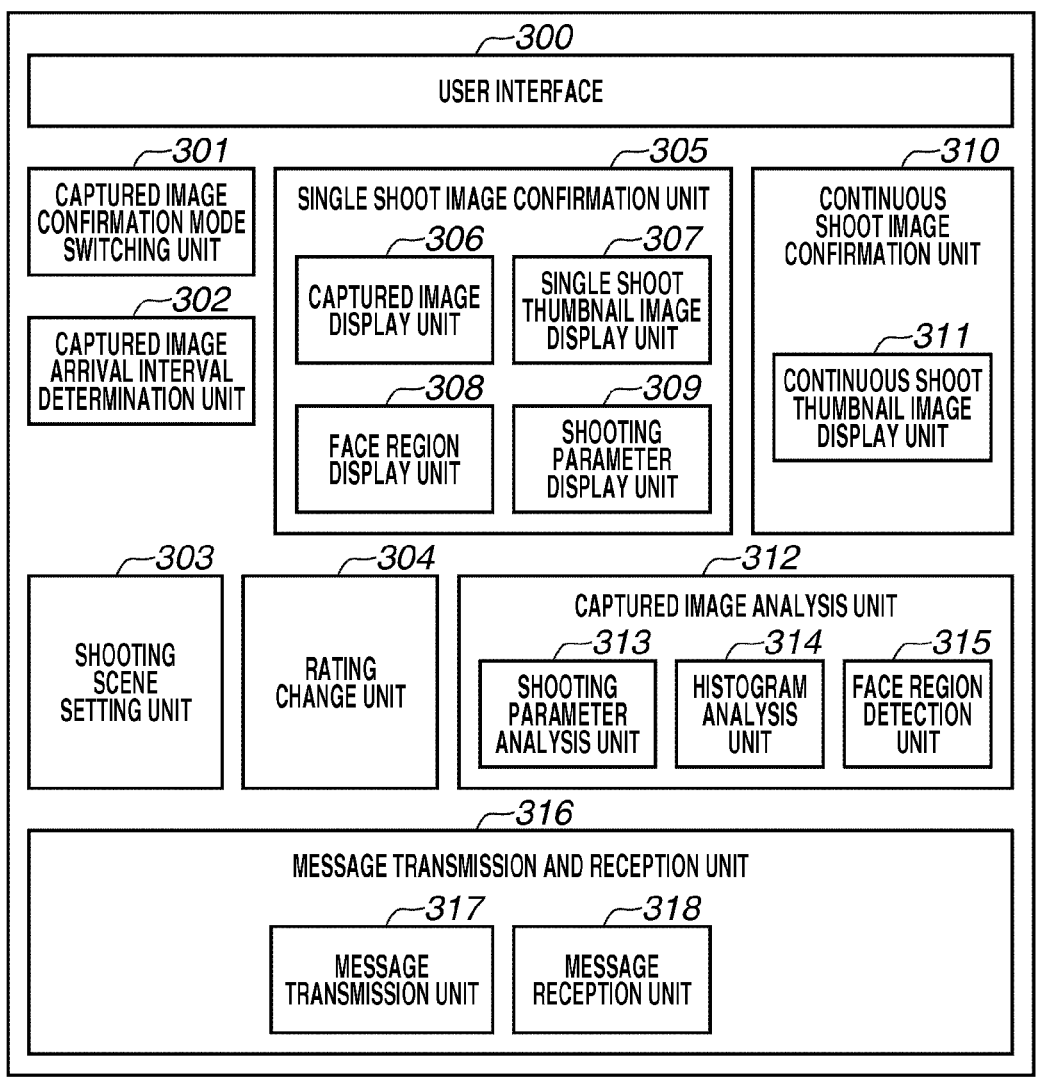
FIG. 3 illustrates an example of a function configuration (a software configuration) of the captured image confirmation apparatus.

FIG. 3 illustrates an example of a function configuration (a software configuration) of the captured image confirmation apparatus 101. A user interface 300 receives and displays input from a user such as a photographer. A captured image confirmation mode switching unit 301 switches a display mode (a confirmation mode) based on an interval at which the captured image arrives from the camera 100 (reception interval). A captured image arrival interval determination unit 302 determines the interval at which the captured image arrives from the camera 100. A shooting scene setting unit 303 manages various shooting parameters for each shooting scene and sets a shooting parameter to the camera 100. A rating change unit 304 changes the rating (evaluated value by the photographer) of a captured image.

A single shoot image confirmation unit 305 is a unit for confirming and determining that the interval at which the captured image arrives from the camera 100 is long and the captured image is a single shooting image. A continuous shoot image confirmation unit 310 is a unit for confirming and determining that the interval at which the captured image arrives from the camera 100 is short and the captured image is a continuous shooting image. A captured image analysis unit 312 analyzes a captured image. A message transmission and reception unit 316 transfers messages to and from the camera 100 and the captured image control apparatus 102. The message transmission and reception unit 316 uses an internet protocol (IP) in transferring messages. The message transmission and reception unit 316 may use both of IPv4 and IPv6 as an IP version. The message transmission and reception unit 316 may use a wired line or wireless communication as a communication path. The message transmission and reception unit 316 can use communication protocols such as TCP, UDP, HTTP, SMTP, SNMP, and FTP.

The single shoot image confirmation unit 305 includes a captured image display unit 306, a single shoot thumbnail image display unit 307, a face region display unit 308, and a shooting parameter display unit 309.

The captured image display unit 306 displays a Fit image. The single shoot thumbnail image display unit 307 displays a thumbnail image at the time of single shooting. The face region display unit 308 displays a face region image. The shooting parameter display unit 309 displays a shooting parameter or a parameter.

The continuous shoot image confirmation unit 310 includes a continuous shoot thumbnail image display unit 311. The continuous shoot thumbnail image display unit 311 displays a thumbnail image at the time of continuous shooting.

A captured image analysis unit 312 includes a shooting parameter analysis unit 313, a histogram analysis unit 314, and a face region detection unit 315.

The shooting parameter analysis unit 313 analyzes to check if the shooting parameter of a captured image is identical to the previously set parameter. The histogram analysis unit 314 creates the histogram of a captured image. The face region detection unit 315 detects a face region from a captured image.

A message transmission and reception unit 316 includes a message transmission unit 317 and a message reception unit 318.

The message transmission unit 317 transmits a message. The message reception unit 318 receives a message.

Figure 4:
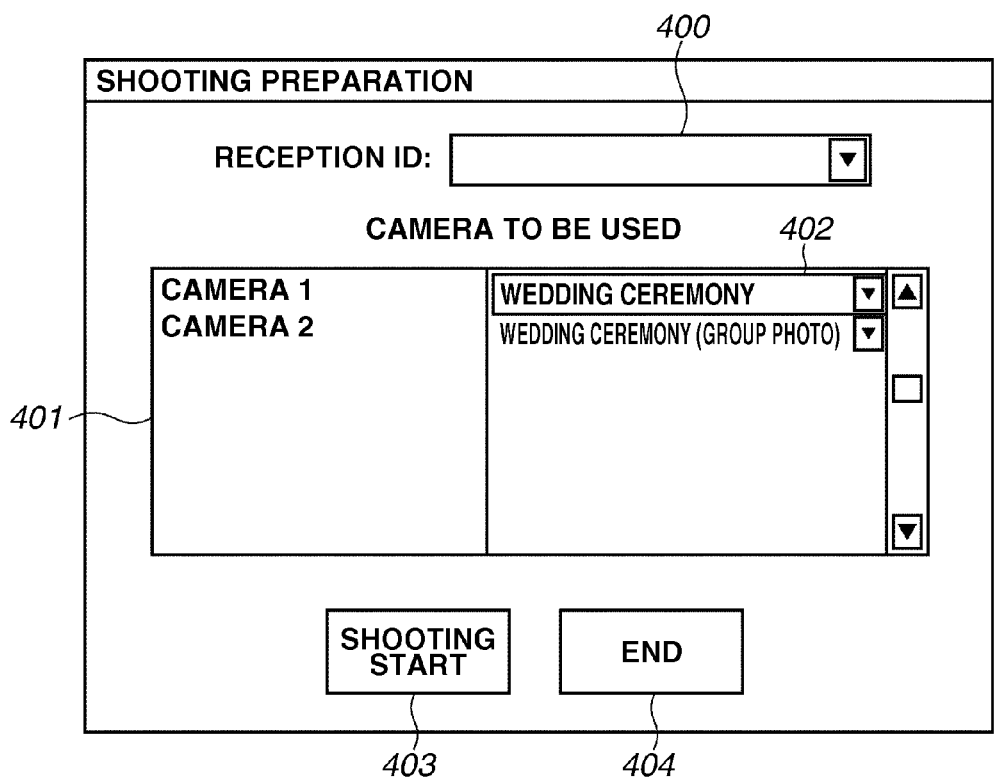
FIG. 4 illustrates an example of a screen displayed by a user interface.

FIG. 4 illustrates an example of a screen displayed by the user interface. FIG. 4 illustrates an example of a screen displayed by the shooting scene setting unit 303 via the user interface 300 in preparing shooting. A user such as a photographer inputs the reception ID of a customer to be captured into a reception ID text box 400. The user selects a shooting scene for a camera indicated on a use camera list 401. The selection is performed by the user operating a shooting scene drop-down list 402 displayed on the screen via the KB 208, for example. The user depresses a shooting start button 403 via the KB 208, for example. The shooting scene setting unit 303 determines shooting parameters for each shooting scene based on a series of the user's operations and sets the shooting parameters to the selected camera.

Figure 5:
FIG. 5 illustrates an example of the setting value table which stores data set in the shooting scene setting unit.

FIG. 5 illustrates an example of the setting value table which stores data set in the shooting scene setting unit 303. The setting value table has setting items such as an ISO sensitivity 501, an Av value 502, and a Tv value 503 for each shooting scene 500. The setting items and the setting values of this setting value table are examples.

Figure 6:
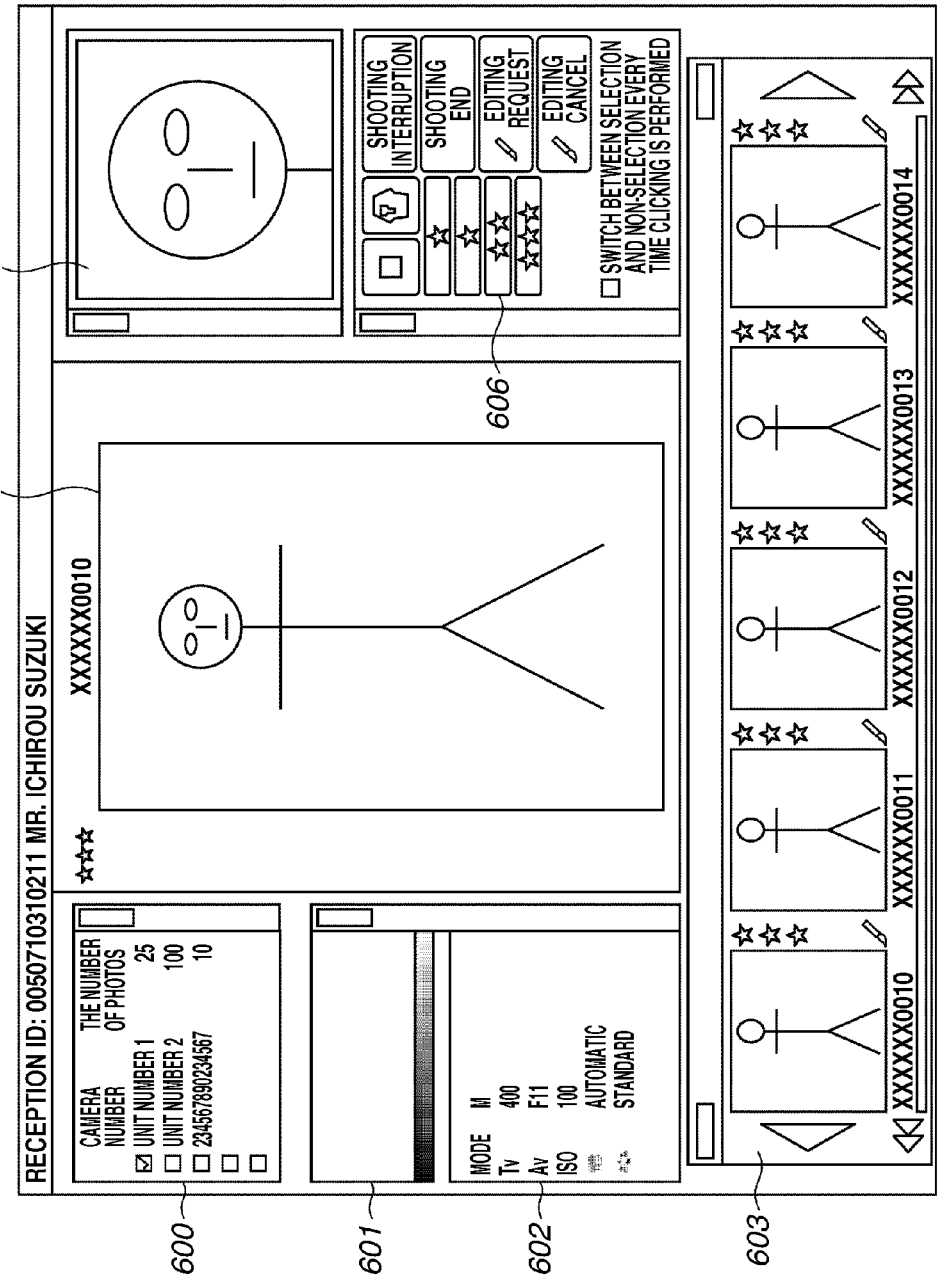
FIG. 6 illustrates a first example of a screen including a captured image displayed by the user interface.

FIG. 6 illustrates a first example of a screen including a captured image displayed by the user interface.

FIG. 6 illustrates an example of the screen displayed by the single shoot image confirmation unit 305 via the user interface 300 in a case where the captured image confirmation mode switching unit 301 determines that a photographer takes a photo in the single shooting mode. The image captured by a user such as a photographer is transferred from the camera 100 to the captured image confirmation apparatus 101. The captured image confirmation apparatus 101 displays the captured image through the image display process of the captured image display unit 306 on a captured image display panel 604 via the user interface 300. The single shoot thumbnail image display unit 307 displays a thumbnail image of the captured image on a single shoot thumbnail image display panel 603 via the user interface 300.

The captured image confirmation apparatus 101 performs a face region detection process in the face region detection unit 315. The face region display unit 308 displays the face region image extracted by the face region detection unit 315 via the user interface 300 on a face region image display panel 605. The shooting parameter of a captured image is analyzed by the shooting parameter analysis unit 313 and the analysis result is displayed on a shooting parameter display list 602 via the user interface 300. The histogram analysis unit 314 analyzes the histogram of the captured image and displays the analysis result on a histogram display panel 601 via the user interface 300. The captured image analysis unit 312, for example, displays which camera has captured a current image on a shooting camera list 600 via the user interface 300.

When a series of the above display processes is ended, the captured image is transferred from the captured image confirmation apparatus 101 to the captured image control apparatus 102. The photographer evaluates the captured image based on the displayed captured image and other information and operates a rating change button 606 to determine the rate of the image. The determined rate is managed in the rating change unit 304.

Figure 7:
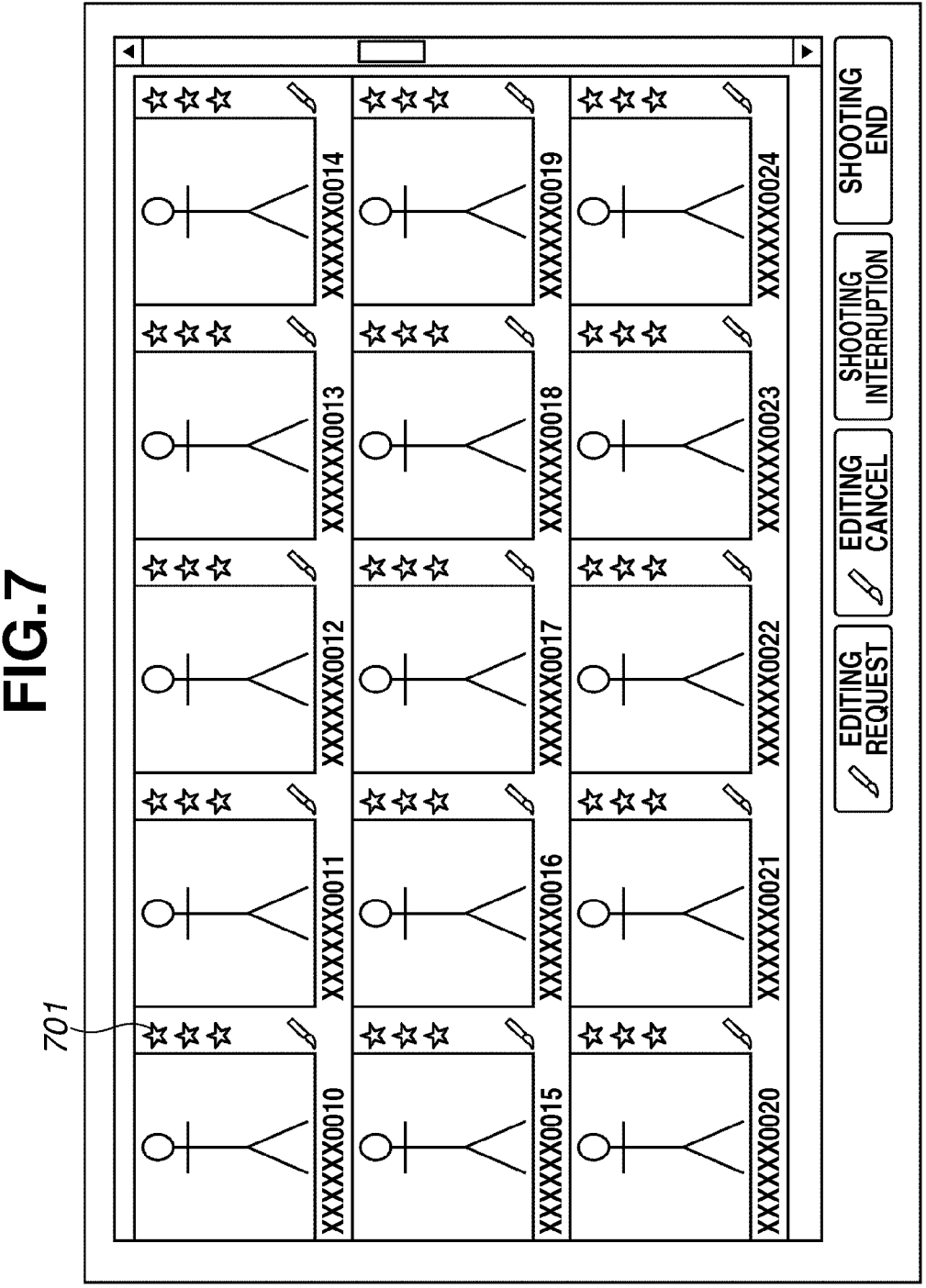
FIG. 7 illustrates a second example of a screen including a captured image displayed by the user interface.

FIG. 7 illustrates a second example of a screen including a captured image displayed by the user interface. FIG. 7 illustrates an example of the screen displayed by continuous shoot image confirmation unit 310 via the user interface 300 in a case where the captured image confirmation mode switching unit 301 determines that a photographer takes a photo in a continuous shooting mode. The image captured by a user such as a photographer is transferred from the camera 100 to the captured image confirmation apparatus 101. The captured image confirmation apparatus 101 causes the continuous shoot thumbnail image display unit 311 to display the thumbnail image of the captured image on a continuous shoot thumbnail image display panel via the user interface 300. The captured image confirmation apparatus 101 performs a face region detection process in the face region detection unit 315. However, the captured image confirmation apparatus 101 does not display a face region image in the continuous shooting mode. This is because the face region detection unit 315 only detects the face region to instantly perform display when the continuous shooting mode is switched to the single shooting mode later or the user intentionally switches the display mode from the continuous shooting mode to the single shooting mode. The shooting parameter analysis unit 313 analyzes the shooting parameter of a captured image. However, the captured image confirmation apparatus 101 does not display the shooting parameter for the reason similar to the case where the face region is detected. The histogram analysis unit 314 analyzes the histogram of the captured image. However, the captured image confirmation apparatus 101 does not display the histogram for the reason similar to the case where the face region is detected.

When a series of the above display processes is ended, the captured image confirmation apparatus 101 transfers the captured image to the captured image control apparatus 102. The photographer evaluates the captured image based on the displayed captured image and other information and operates a rating change button 701 to determine the rate of the image. The determined rate is managed in the rating change unit 304.

Figure 8:
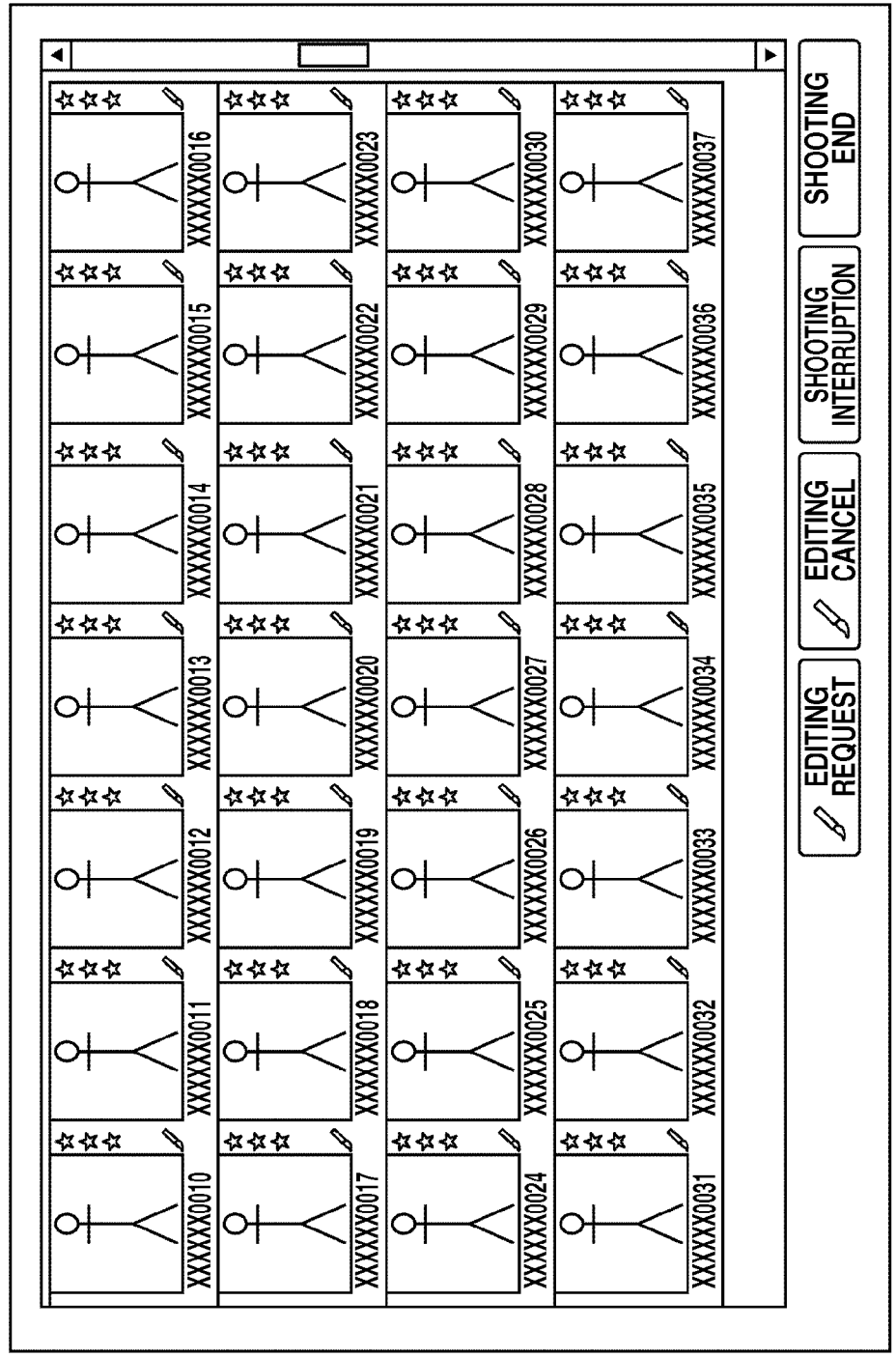
FIG. 8 illustrates a third example of a screen including a captured image displayed by the user interface.

FIG. 8 illustrates a third example of a screen including a captured image displayed by the user interface. FIG. 7 illustrates an example of the screen in a case where the captured image arrival interval determination unit 302 determines that the arrival interval of the image is shorter than a first threshold and the captured image confirmation mode switching unit 301 determines that the photographer takes a photo in the continuous shooting mode. FIG. 8 illustrates an example of a screen displayed by the continuous shoot image confirmation unit 310 via the user interface 300 in a case where the captured image arrival interval determination unit 302 determines that the arrival interval of the image is shorter than a second threshold that is shorter than the first threshold.

If it is determined that photos are taken in the continuous shooting mode and the arrival interval of the image is shorter than the prescribed value, the continuous shoot thumbnail image display unit 311 reduces the size of a thumbnail image. The continuous shoot thumbnail image display unit 311 displays a larger number of captured images on the continuous shooting thumbnail image display panel. In the present exemplary embodiment, the thumbnail image is reduced in size only one stage but a plurality of the prescribed values for the arrival interval of the image may be set. More specifically, the continuous shooting thumbnail image display unit 311 can more finely change the display size of a thumbnail image according to the arrival interval of the image using the size of a thumbnail image in many stages.

Figure 9:
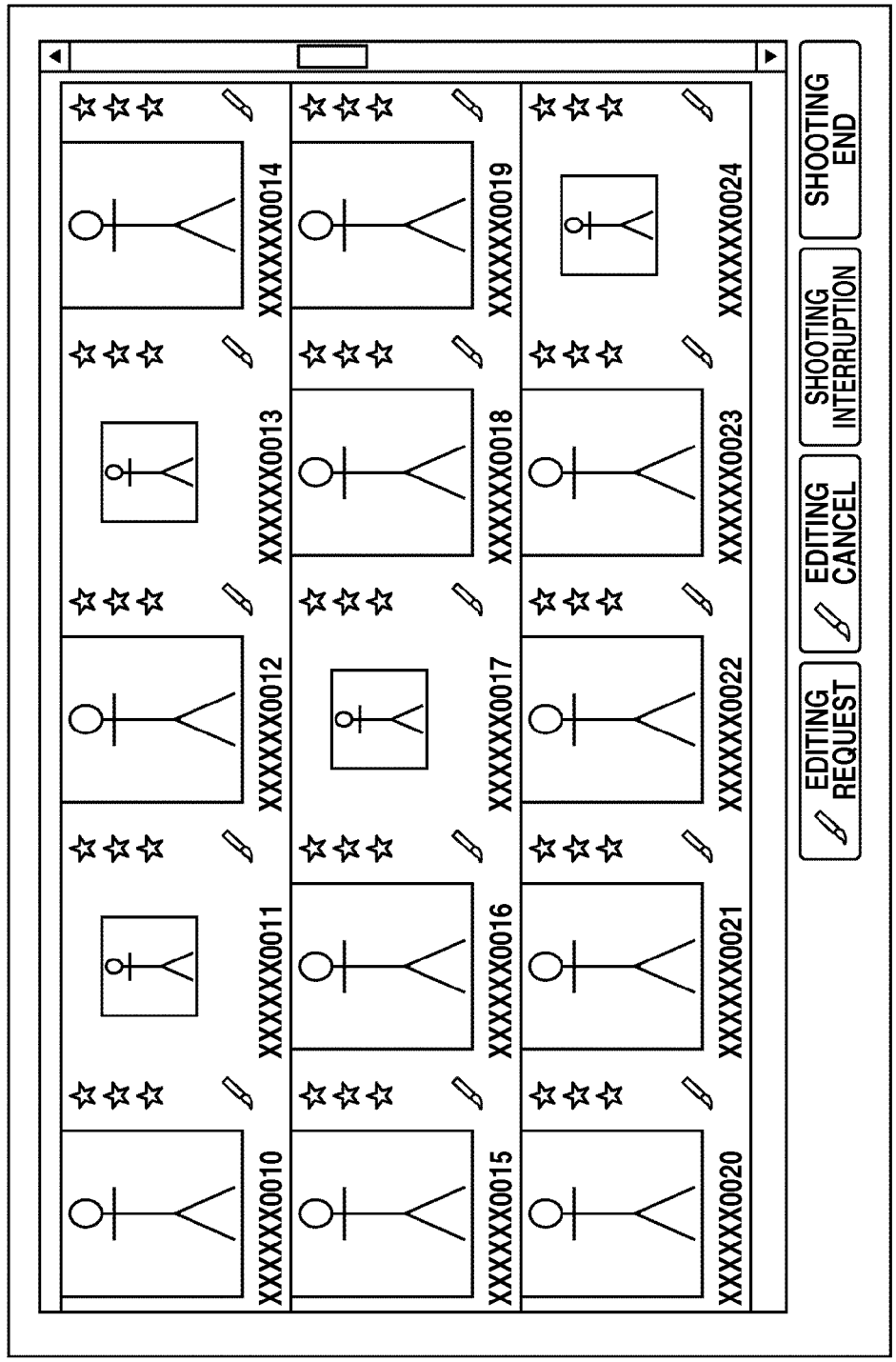
FIG. 9 illustrates a fourth example of a screen including a captured image displayed by the user interface.

FIG. 9 illustrates a fourth example of a screen including a captured image displayed by the user interface. FIG. 9 illustrates an example of the screen in a case where the captured image confirmation mode switching unit 301 determines that the photographer takes a photo in the continuous shooting mode and the change of size of a thumbnail image is set based on an image evaluation (analysis result of the image). In this case, the captured image confirmation apparatus 101 evaluates whether a face exists in the captured image transferred from the camera 100 and a shooting parameter fits (corresponds to) the previously set shooting scene. If the above two conditions are satisfied, the continuous shooting thumbnail image display unit 311 displays a normal-sized thumbnail image. The term "normal-size" refers to a display size according to the arrival interval of an image illustrated in FIG. 8. If there are items which do not satisfy the two conditions, the continuous shooting thumbnail image display unit 311 changes the normal-sized thumbnail image to the thumbnail image one stage smaller than the normal-sized and displays the thumbnail image.

If a rate managed by the rating change unit 304 is low, the continuous shooting thumbnail image display unit 311 may change the size of a thumbnail image according to the rate. Although the image evaluation described in the above example uses two conditions as to whether a face region exists and the shooting parameter fits the shooting scene, the continuous shooting thumbnail image display unit 311 may change the size of a thumbnail image according to other evaluation items such as exposure and focusing. In the present exemplary embodiment, the change of size in the image evaluation is described only in a display mode of the continuous shooting mode. The single shooting thumbnail image display unit 307, however, may also change the size of a thumbnail image based on the image evaluation and display the image on the single shooting thumbnail image display panel 603.

Figure 10:
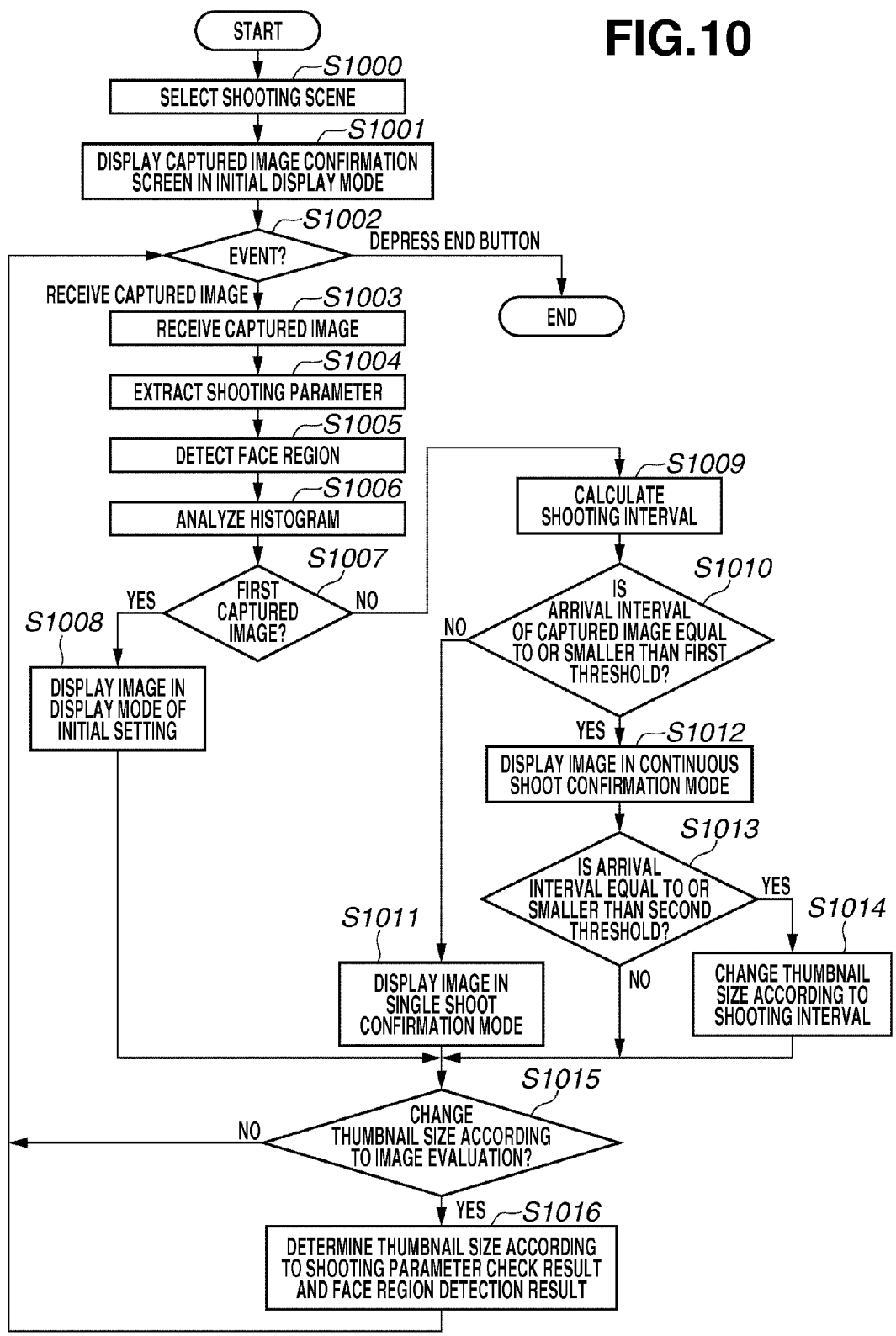
FIG. 10 is a flow chart illustrating an example of an image display process in the captured image confirmation apparatus.

FIG. 10 is a flow chart illustrating an example of an image display process in the captured image confirmation apparatus 101. For the sake of simplicity, the following description is made on the assumption that the CPU 201 performs processes.

After a process is started, in step S1000, the CPU 201 displays a shooting preparation screen illustrated in FIG. 4. A user such as a photographer inputs the reception ID into the reception ID text box 400 and selects a shooting scene for each camera from the shooting scene drop-down list 402. The user depresses the shooting start button 403. The CPU 201 transmits the shooting parameter set to the shooting scene selected for a camera based on a series of the user's operations.

In step S1001, the CPU 201 displays a screen for a single shooting display mode in FIG. 6 or a continuous shooting display mode in FIG. 7. At this point, the CPU 201 displays the screen for the display mode set as an initial setting.

In step S1002, the CPU 201 waits to receive a captured image from the camera 100 or an event of end of an application.

If it is determined that the captured image is received from the camera 100, in step S1003, the CPU 201 receives the captured image from the camera 100.

In step S1004, the CPU 201 analyzes a shooting parameter appended to an captured image, for example.

In step S1005, the CPU 201 detects a face region from the captured image. In step S1006, the CPU 201 performs a histogram analysis of the captured image.

In step S1007, the CPU 201 determines whether the captured image is the first one. If the CPU 201 determines that the captured image is the first one (YES in step S1007), in step S1008, the CPU 201 displays the captured image in the initially set display mode because a shooting interval cannot be calculated.

If the CPU 201 determines that the captured image is not the first one (NO in step S1007), in step S1009, the CPU 201 calculates the arrival interval (the shooting interval) of the captured image.

In step S1010, the CPU 201 determines whether the image is captured in the single or continuous shooting modes based on whether the arrival interval of the captured image is equal to or smaller than the first threshold and switches the display mode of the captured image according to the determination result.

If the CPU 201 determines that the image is captured in the single shooting mode (NO in step S1010), in step S1011, the CPU 201 displays the image in a single shooting confirmation mode (a single shooting display mode) as illustrated in the single shooting image confirmation screen in FIG. 6.

If the CPU 201 determines that the image is captured in the continuous shooting mode (YES in step S1010), in step S1012, the CPU 201 displays the image in a continuous shooting confirmation mode (a continuous shooting display mode) as illustrated in the continuous shooting image confirmation screen in FIG. 7.

In step S1013, the CPU 201 determines an accurate arrival interval of the image in the continuous shooting mode. More specifically, the CPU 201 determines whether the arrival interval of the image is equal to or smaller than the second threshold, in other words, the image is captured in a high-speed continuous shooting mode.

If the arrival interval is equal to or smaller than the second threshold, in other words, the image is captured in a high-speed continuous shooting mode (YES S1013), the CPU 201 changes the size of the thumbnail image according to the shooting interval. As a result, the image is displayed as illustrated in FIG. 8.

In step S1015, the CPU 201 determines whether the size of the thumbnail image needs to be changed according to the image evaluation based on whether setting for changing the size of the thumbnail image is made on the setting file according to the image evaluation.

If the CPU 201 determines that the size of the thumbnail image does not need to be changed (NO in step S1015), the CPU 201 causes the processing to return to an event waiting process in step S1002.

If the CPU 201 determines that the size of the thumbnail image needs to be changed (YES in step S1015), the CPU 201 executes the process in step S1016. More specifically, the CPU 201 changes the size of the thumbnail image, for example, based on whether the shooting parameter extracted in step S1004 fits the shooting scene selected in step S1000 and the face region is detected in step S1005. If the rate is set by the photographer, the CPU 201 may change the size of the thumbnail image according to the set rate in addition to the above conditions. As a result, the image is displayed as illustrated in FIG. 9. If the size of the thumbnail image is changed in the single shooting mode, the CPU 201 displays the thumbnail image in a changed size on the single shoot thumbnail image display panel 603 illustrated in FIG. 6.

The CPU 201 causes the processing to return to the event waiting process in step S1002.

In step S1002, if it is determined that the end of the processing is selected, the CPU 201 ends the image display process illustrated in FIG. 10.

The present invention can provide a technique capable of improving the productivity of a photographer being a user.

[Other Exemplary Embodiments]

The present invention can realize the functions of the above exemplary embodiment by a central processing unit (CPU) of an apparatus reading the program code of software from a storage apparatus and executing it. The above exemplary embodiment includes the case where the functions of the above exemplary embodiment are realized by an operating system (OS) performing apart or all of the actual processes based on the instructions of the read program code.

According to the above exemplary embodiments, the captured image confirmation apparatus 101 prepares the single and continuous shooting display modes and can automatically switch between the display modes according to an interval at which an image arrives from the camera (shooting interval). A photographer can confirm an image according to his or her taste. The captured image confirmation apparatus 101 can change the size of a thumbnail image according to the interval of the continuous shooting and the result of image evaluation in the continuous shooting mode. Therefore, the photographer can easily grasp shooting status in the continuous shooting mode. Accordingly, the above exemplary embodiments can provide a technique capable of improving the productivity of a photographer being a user.

While the exemplary embodiments of the present invention are described above in detail, the present invention is not construed as being limited to the description of the specific exemplary embodiments concerned, and various modifications and alternations may be made without departing from the scope of the present invention as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-240752 filed Oct. 19, 2009, which is hereby incorporated by reference herein in its entirety.

What is claimed is:

1. A display apparatus comprising:
    a calculation unit configured to calculate an interval between a time when a first image is captured and a time when a second image is captured; and
    a switching unit configured to switch a display mode of the captured image to a first display mode for displaying at least one of the first and second images or a second display mode for displaying at least one of the first and second images based on the interval, wherein a display form in which the at least one of the first and second images is displayed in the first display mode is different from a display form in which the at least one of the first and second images is displayed in the second display mode.

2. The display apparatus according to claim 1, further comprising:
    a change unit configured to change the size of the displayed captured image based on the interval of the captured image if the captured image is displayed in the second display mode.

3. The display apparatus according to claim 1, further comprising:
    a reception unit configured to receive the first captured image and the second captured image from an imaging apparatus
    an analysis unit configured to analyze the captured image received by the reception unit; and
    a change unit configured to change the size of the captured image to be displayed based on the result of analysis of the captured image by the analysis unit.

4. The display apparatus according to claim 3, wherein the analysis unit analyzes whether a face region is included in the captured image.

5. The display apparatus according to claim 3, wherein the analysis unit analyzes whether the captured image corresponds to a predetermined shooting scene.

6. A display method in a display apparatus, comprising:
    calculating an interval between a time when a first image is captured and a time when a second image is captured; and
    switching a display mode of the captured image to a first display mode for displaying at least one of the first and second images or a second display mode for displaying at least one of the first and second images based on the interval, wherein a display form in which the at least one of the first and second images is displayed in the first display mode is different from a display form in which the at least one of the first and second images is displayed in the second display mode.

7. A non-transitory computer-readable storage recording medium on which has been recorded a program for causing a computer to execute a method of controlling a display apparatus, the method comprising:
    calculating an interval between a time when a first image is captured and a time when a second image is captured; and
    switching a display mode of the captured image to a first display mode for displaying the at least one of the first and second images or a second display mode for displaying at least one of the first and second images based on the interval, wherein a display form in which the at least one of the first and second images is displayed in the first display mode is different from a display form in which the at least one of the first and second images is displayed in the second display mode.

8. A display control apparatus comprising:
    a setting unit configured to set a display size of each group of continuously-shot images according to a condition concerning continuous shooting of the group of continuously-shot images;
    a selection unit configured to select an image satisfying a predetermined condition from a group of continuously-shot images; and
    a display control unit configured to, in a case where a first group of images is displayed in a continuous shooting display mode concerning continuous shooting display, display each image of the first group in the display size set by the setting unit and display the image selected by the selection unit from the first group in a display size different from the display size set by the setting unit.

9. The display control apparatus according to claim 8, wherein a plurality of single-shot images are displayed without changing a display size to a display size based on the predetermined condition.

10. The display control apparatus according to claim 8, wherein the predetermined condition is based on an imaging parameter in shooting an image.

11. The display control apparatus according to claim 8, wherein the condition concerning continuous shooting is based on a parameter concerning continuous shooting.

12. The display control apparatus according to claim 11, wherein the parameter concerning continuous shooting is based on a continuous shooting speed.

13. The display control apparatus according to claim 8, wherein a plurality of single-shot images are displayed in a display form different from the continuous shooting display mode.

14. The display control apparatus according to claim 8, wherein a list of a plurality of images is displayed in a first display area, and an image selected from the plurality of images displayed in the first display area is displayed in a second display area in a display form in which the selected image is displayed in a display size larger than a display size of the plurality of images displayed in the first display area.

15. The display control apparatus according to claim 14, wherein a display form in which images are displayed in the first display area and the second display area is a display form in which single-shot images are displayed.

16. The display control apparatus according to claim 8, wherein additional information on an image to be displayed is displayed.

17. The display control apparatus according to claim 16, wherein the additional information includes an imaging parameter in shooting the image.

18. The display control apparatus according to claim 16, wherein the additional information includes a histogram of the image.

19. The display control apparatus according to claim 16, wherein the additional information is not displayed in the continuous shooting display mode.

20. An image display method to be executed by a display control apparatus, the method comprising:
    setting a display size of each group of continuously-shot images according to a condition concerning continuous shooting of the group of continuously-shot images;
    selecting an image satisfying a predetermined condition from a group of continuously-shot images; and displaying, in a case where a first group of images are displayed in a continuous shooting display mode concerning continuous shooting display, each image of the first group in the set display size, and displaying the image selected from the first group in a display size different from the set display size.

21. A non-transitory computer-readable storage recording medium storing a program for causing a computer to execute the image display method according to claim 20.

* * * * *